C. C. JOHNSON,
Assignor to S. A. EATON.
Wheelbarrow.
No. 9,323. Reissued July 27, 1880.
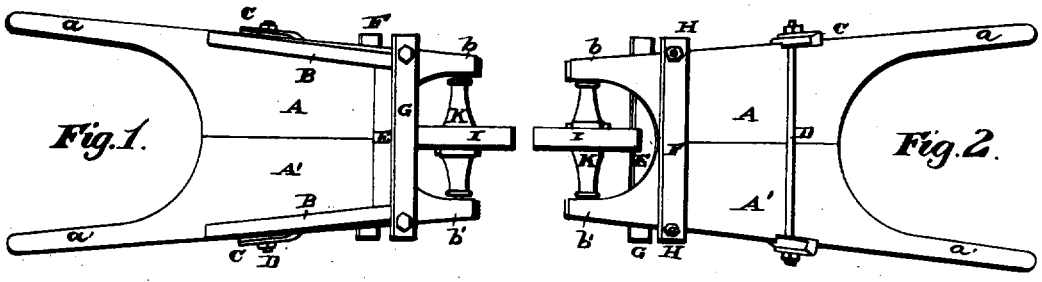
Fig. 3.
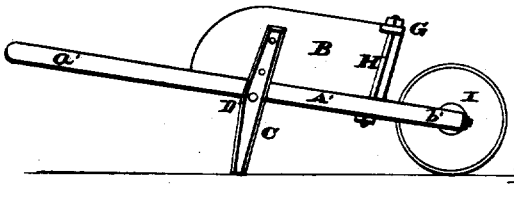
Fig. 4.
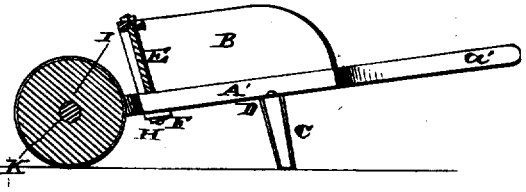
Fig. 5.
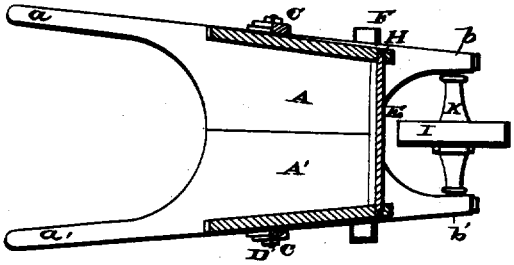
WITNESSES
F. O. McCleary,
A. M. Bright.
INVENTOR
C. C. Johnson,
By Leggett & Leggett.
ATTORNEY
N. PETERS, PHOTO-LITHOGRAPHER, WASHINGTON, D. C.

UNITED STATES PATENT OFFICE.

CHARLES C. JOHNSON, OF SPRINGFIELD, VERMONT, ASSIGNOR TO STEPHEN A. EATON.

WHEELBARROW.

SPECIFICATION forming part of Reissued Letters Patent No. 9,323, dated July 27, 1880.

Original No. 86,077, dated January 19, 1869. Application for reissue filed November 26, 1879.

*To all whom it may concern:*

Be it known that I, CHARLES C. JOHNSON, of Springfield, in the county of Windsor, State of Vermont, have invented a new and useful Improvement in Wheelbarrows; and I do hereby declare the same to be fully described in the following specification and represented in the accompanying drawings, of which—

Figure 1 denotes a top view, Fig. 2 a bottom view, Fig. 3 a side elevation, and Fig. 4 a longitudinal section, of a wheelbarrow made in accordance with my invention. Fig. 5 is a horizontal section taken through its sides and above its bottom.

The purpose of my invention is to produce a wheelbarrow that can be readily taken to pieces, so as to be packed or folded in less space for transportation from place to place.

My invention consists in so constructing the parts that they can all be fastened together with bolts, by removing which the structure may be taken apart and packed closely in knockdown condition.

In carrying out my invention I form the bottom, the two handles, and the wheel-shaft-supporting struts or arms in two separate pieces or boards, as shown at A A′, the part *a a′* of which denote the handles and the parts *b b′* the wheel-journal-supporting arms. These pieces are arranged with their line of juncture along the middle of the barrow. To each side piece, B, I fix one of the legs, C, and extend through both of the said legs a bolt, D, provided with a head at one end and a screw or nut at the other. Next I employ to hold the two side pieces, B B, and the end pieces, E, together, and to the bottom pieces, as well as to aid in holding such bottom pieces together, two horizontal bars, F G, and two screw-bolts, H H, provided with nuts, the whole being arranged in manner as represented in the drawings. The wheel I and its axle K are disposed between the two arms *b b′*, the axle being pivoted to such arms. The axle may be applied to the wheel, so as to enable the two to be easily separated when removed from the rest of the barrow.

From the above it will be easily seen that for the purpose of reducing the wheelbarrow in bulk, (or making it what I term a "knock-down" wheelbarrow,) so as to enable it to be transported from place to place to better advantage than when in the form and for use as a wheelbarrow, I have only to separate the parts, to fold or lay one half of the bottom with its handle and arm over upon the other half with its handle and arm, after which the rest of the parts of the barrow may be piled or laid upon the other half of the bottom.

For armies or for use on railways such barrows will be found to be of great advantage, as, when taken apart, they can be packed in very much less space than they would take up when set up ready for use.

I would remark that, by having the bottom of the barrow, its handle, and wheel-shaft-supporting arms formed in the parts, as described, I can pivot the wheel-shaft directly to the arms, each having a round hole or bearing formed in it to receive a journal of the axle.

What I claim is—

1. In a wheelbarrow, the combination, with two independent body parts respectively provided with a handle and a wheel-shaft-supporting arm, of bolt mechanism which connects said independent parts together and permits the wheelbarrow to be packed in a knock-down condition, substantially as set forth.

2. In a wheelbarrow, the combination, with independent body parts respectively provided with a handle and a wheel-shaft-supporting arm, of a bolt which passes through the two legs and secures said parts together, substantially as set forth.

3. In a wheelbarrow, the combination, with independent body parts respectively provided with a handle and a wheel-shaft-supporting arm, of two side pieces formed independent of said body parts, legs respectively secured to the side pieces and also formed independent of the body parts, and a bolt which connects said legs together, substantially as set forth.

4. In a wheelbarrow, the combination, with independent body parts respectively provided with a handle and a wheel-shaft-supporting arm, of side pieces formed independent of said body parts, legs respectively secured to the side pieces, and also formed independent of the body parts, and a bolt which extends beneath said body parts and connects the legs together, substantially as set forth.

5. In a wheelbarrow, the combination, with independent body parts respectively provided with a handle and a wheel-shaft-supporting arm, of a cross-bar located over the end piece, a cross-bar located beneath the bottom pieces, and bolts which connect the corresponding extremities of said cross-bars together, substantially as set forth.

6. In a wheelbarrow, the combination, with independent body parts respectively provided with a handle and a wheel-shaft-supporting arm, of an end piece formed independent of said body parts, a cross-bar located over the end piece, a cross-bar located beneath the body parts, and bolts which connect together the corresponding extremities of said cross-bars, substantially as set forth.

7. In a wheelbarrow, the arrangement of the bottom, the handles, and the wheel-supporting arms in two separate pieces, A A′, in the manner as specified.

8. The combination, with the pieces A A′, as set forth, of the legs, sides, and front board applied to such pieces, the whole secured by screw-bolts D H H and cross-bars F G, substantially as described, whereby a knock-down structure is obtained.

In testimony whereof I have hereunto set my hand in the presence of two witnesses.

CHARLES C. JOHNSON.

Witnesses:

JEROME W. PIERCE,
J. W. HASTINGS.